United States Patent

Buekers et al.

[11] Patent Number: 5,816,853
[45] Date of Patent: Oct. 6, 1998

[54] COAXIAL CABLE CONNECTOR HOUSING

[75] Inventors: Valere Buekers, Zelem-Halen; Etienne Laeremans, Scherpenheuvel; Luiz Neves Mendes, Begijnendijk; Marc Demesmaeker, Antwerp; Pieter De Coster, Linden, all of Belgium

[73] Assignee: N.V. Raychem S.A., Kessel-Lo, Belgium

[21] Appl. No.: 605,186

[22] PCT Filed: Sep. 2, 1994

[86] PCT No.: PCT/GB94/01908

§ 371 Date: Sep. 16, 1996

§ 102(e) Date: Sep. 16, 1996

[87] PCT Pub. No.: WO95/06892

PCT Pub. Date: Mar. 9, 1995

[30] Foreign Application Priority Data

Sep. 3, 1993 [GB] United Kingdom ............... 9318256

[51] Int. Cl.⁶ ......................................... H01R 13/52
[52] U.S. Cl. ................................. 439/521; 439/367
[58] Field of Search .................... 439/527, 718, 439/367, 271–276, 936; 174/76, 92

[56] References Cited

U.S. PATENT DOCUMENTS

| 3,680,036 | 7/1972 | McCamis et al. | 439/367 |
| 4,219,693 | 8/1980 | French | 174/92 |
| 4,426,108 | 1/1984 | Kesselman | 439/304 |
| 4,691,974 | 9/1987 | Pinkerton et al. | 439/367 |
| 4,859,809 | 8/1989 | Jervis | 174/92 |
| 4,998,894 | 3/1991 | Gronvall | 439/521 |
| 5,226,837 | 7/1993 | Cinibulk et al. | 439/521 |
| 5,347,084 | 9/1994 | Roney et al. | 439/521 |
| 5,382,756 | 1/1995 | Dagan | 439/367 |
| 5,410,105 | 4/1995 | Tahana et al. | 439/521 |

FOREIGN PATENT DOCUMENTS 92 22116  12/1992  WIPO.

OTHER PUBLICATIONS

Abstract of Israeli Patent Document No. 48649.
Abstract of Israeli Patent Document No. 69031.

Primary Examiner—Hien Vu
Attorney, Agent, or Firm—Herbert G. Burkard

[57] ABSTRACT

A cable connector housing (11) for surrounding and sealing a coaxial cable connection, the housing (11) comprising two elongate body portions (12) (13) that surround the cable (51) and connector (52). One end of the housing (11) has a smaller part or opening (14) for accommodating the cable and the other end of the housing has a larger opening (15) for accommodating a connector. The one end of the housing (11) is shaped preferably frusto-conically, to force sealing gel within the housing (11) towards the other end of the housing when the two body portions are assembled around the connection.

9 Claims, 3 Drawing Sheets

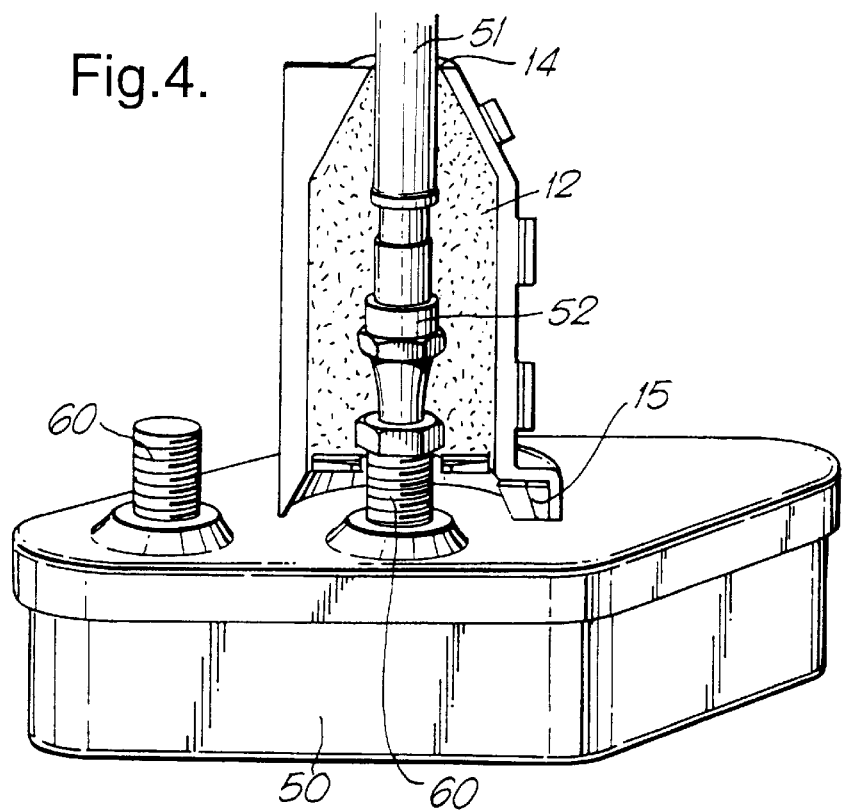
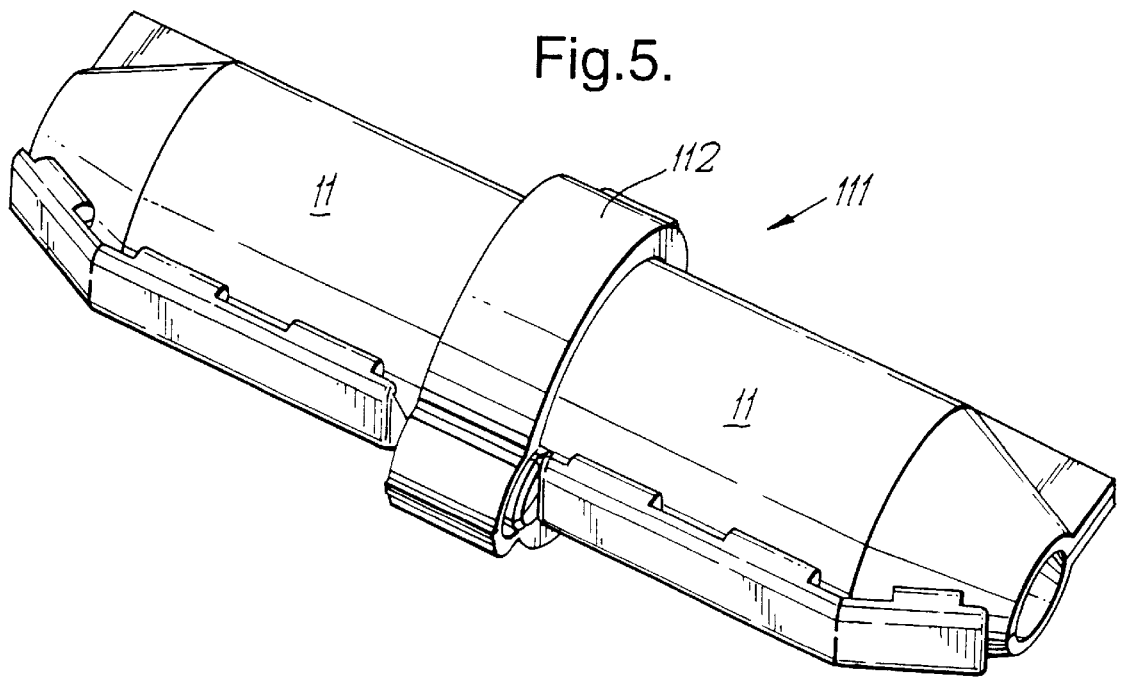

COAXIAL CABLE CONNECTOR HOUSING

BACKGROUND OF THE INVENTION

This invention relates to connector housings for coaxial cables and in particular to connector housings for surrounding a cable TV connection.

Connector housings for the protection of radio frequency cable connections such as tap or drop-off terminals are known from U.S. Pat. No. 4,998,894. These prior art housings contain an environmental sealing material usually a gel, which is held by the housing around the connection.

A problem associated with the above prior art housing is ensuring that the gel flows sufficiently to protect all parts of the connection when the housing is assembled around the cable and connection.

SUMMARY OF THE INVENTION

The present invention seeks to provide a cable connector housing with environmental sealing.

According to the present invention there is provided a cable connector housing for surrounding and sealing coaxial cable connections, the housing comprising at least two elongate body portions for surrounding the cable and connector, one end of the housing having a smaller opening for accommodating the cable and the other end having a larger opening to accommodate a connector, said one end or other part of the housing being shaped to force sealing means within the housing towards said other end of the housing when the elongate body portions are assembled around a connection.

Preferably said one end of the housing has a frusto-conical configuration.

The two housing body portions may be hinged together along one pair of longitudinal edges, and preferably the two edges have a snap fit connection.

The housing may be provided with a sealing means located within each body portion, or the sealing means may be provided separately. There is provided an in-line cable connector housing for in-line connection between two coaxial cables, the connector comprising two housings of the above type linked together at their said other ends by an annular collar.

The invention further provides a kit-of-parts for environmentally protecting a coaxial cable connection; and comprising at least one housing of the invention and a sealing material to be contained within the housing.

BRIEF DESCRIPTION OF THE DRAWINGS

The invention will be described by way of example and with reference to the accompanying drawings in which:

FIG. 4 is a schematic drawing showing one body portion in location around a cable connection;

FIG. 5 shows an isometric view of an in-line connector housing;

DESCRIPTION OF THE PREFERRED EMBODIMENT

Figure 1:
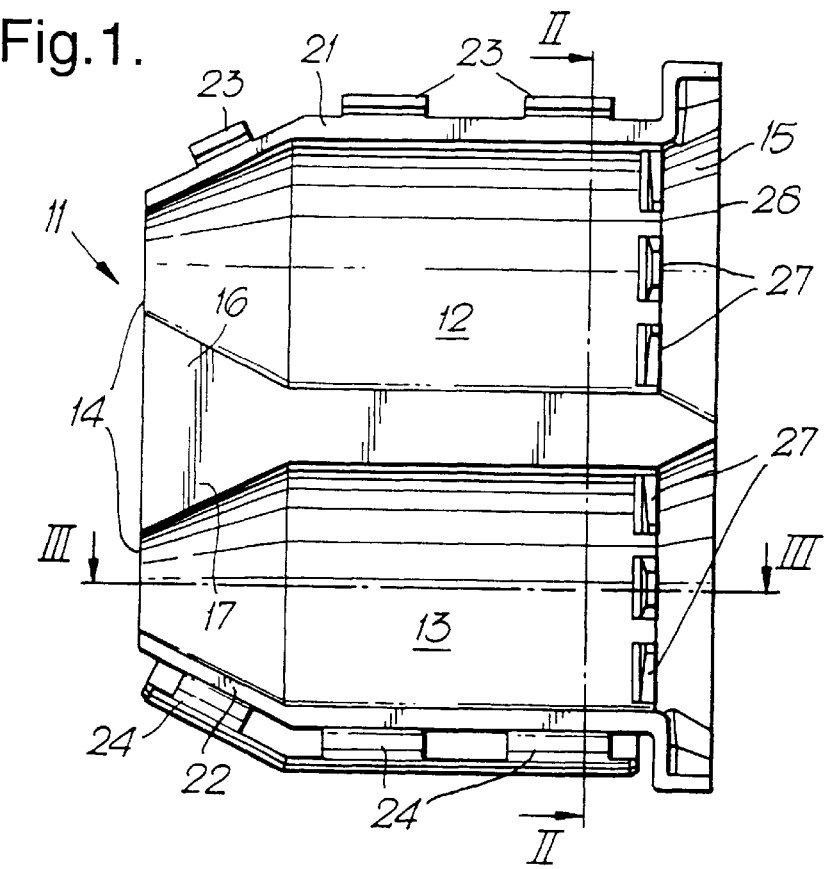
FIG. 1 is a view of the cable connector housing of the present invention showing the two body portions when fully open.
Figure 2:
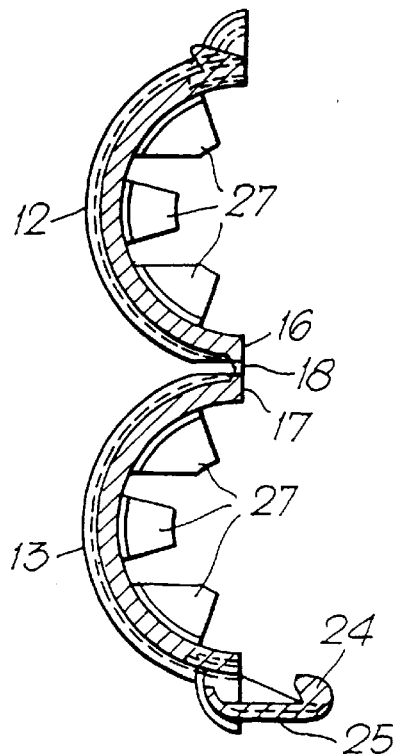
FIG. 2 is a section on the line II—II of FIG. 1.
Figure 3:
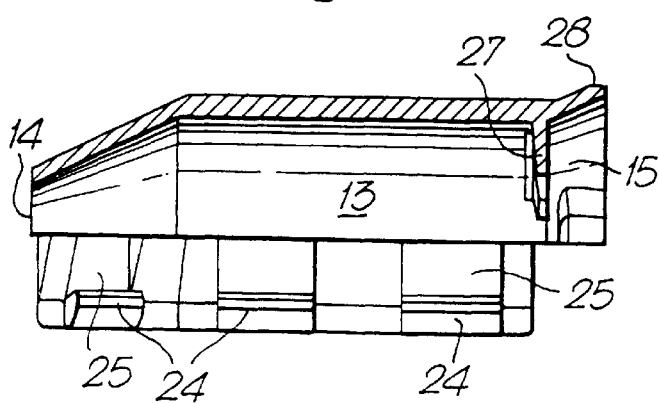
FIG. 3 is a section on the line III—III of FIG. 1.

With reference to FIGS. 1 to 3, there is shown a cable connector housing 11 comprising elongate body portions 12 and 13. The housing 11 when in an assembled condition is substantially tubular having at one end a smaller diameter inlet port 14 to allow a coaxial cable to pass into the housing 11, and the other end 15 is open to accommodate a coaxial connector.

The two body portions 12 and 13 are linked together along one pair of longitudinal edges 16 and 17 by a living or other integral hinge 18 so that the hinge 18, and body portions 12 and 13 form a single piece which may be moulded from a plastics material such as nylon 66, or polypropylene. The other pair of longitudinal edges 21, 22 interconnect when the housing is in a closed condition and may be maintained in a closed condition by means of a snap-fit connector. The snap-fit connector comprises axial spaced detents 23 on the radially outer surface of the body portion 12 spaced along the longitudinal edge 21, and similarly spaced teeth 24 on the radially outer surface of the other body portion 13 which are held at the ends of resilient tangential arms 25. The resilient arms 25 flex sufficiently for the teeth 24 to ride over and engage the detents 23.

The larger open end 15 of the housing 11 has therein a plurality of circumferentially spaced radially inwardly projecting teeth 27. These teeth 27 in use engage an abutment surface on a terminal.

The one end of the housing 11 adjacent the smaller diameter inlet portion 14 has a frusto-conical concave configuration.

The body portions 12 and 13 are filled with an environmental sealing material such as a gel, for example a silicone, polyurethane block-copolymer-based gel. Such base polymers may be extended with suitable materials such as mineral or other oils. A preferred gel is based on styrene-ethylene-butylene-styrene block copolymers such as those known by the trade mark Kraton, or on styrene-ethylene propylene-styrene block copolymers such as those known by the trade mark Septon. The gels preferably have a cone penetration from 50–350 ($10^{-1}$ mm) and an ultimate elongation of at least 100% and preferably greater than 200%. Such gels are described in U.S. Pat. Nos. 4,600,261, 4,634, 201, 4,643,924 and 4,690,831.

The gels may be poured into the body portions in liquid state and permitted to cure either chemically or through the formation of physical cross-links on cooling.

Now with reference to FIG. 4, source of a radio frequency 50 signal such as a CATV splitter box has a radio frequency terminal tap 60. A coaxial cable 51 is connected to the terminal 60 by a connector 52. The housing 11, filled in its hollow interior with a gel, is fitted around the terminal 60 and connector 52. A suitable shield, as disclosed in U.S. Pat. No. 4,717,355, is inserted in the housing 11 to prevent interference. The body portions 12, 13 when assembled together around the cable and terminal 60 cause gel to flow around the cable 51 and connector 52 and particularly towards the larger opening 15 of the housing 11. The frusto-conical shape of the said one end causes the gel to flow towards the outer end of the housing when the two body portions 12, 13 are snap-fitted together around the cable and terminal. The gel may also be maintained under compression after the housing 11 is assembled.

The outer cylindrical surface of the housing at said other end 15 has a raised annular boss 28 thereon adjacent the outlet of the housing.

Figure 6:
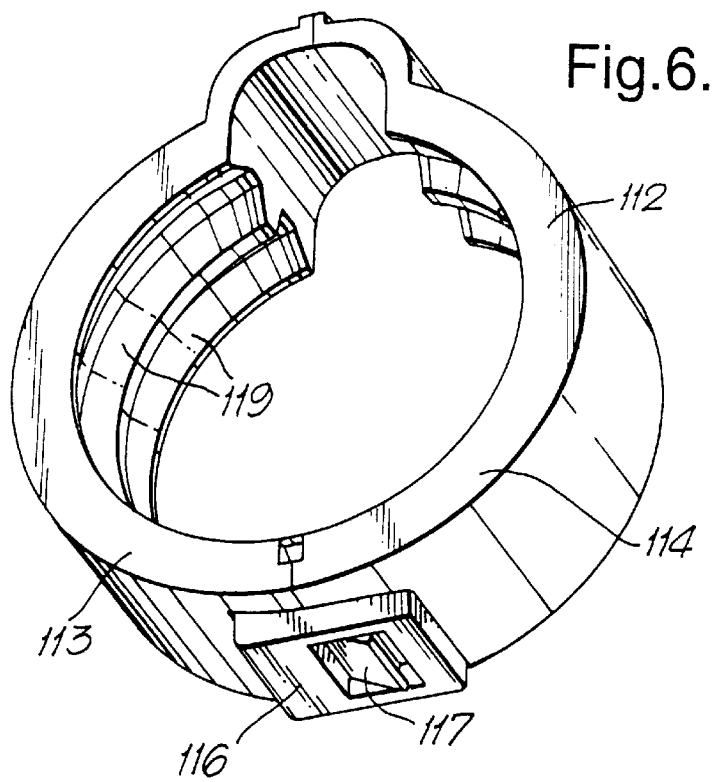
FIG. 6 is an isometric view of the connecting collar of FIG. 5 in the closed condition.
Figure 7:
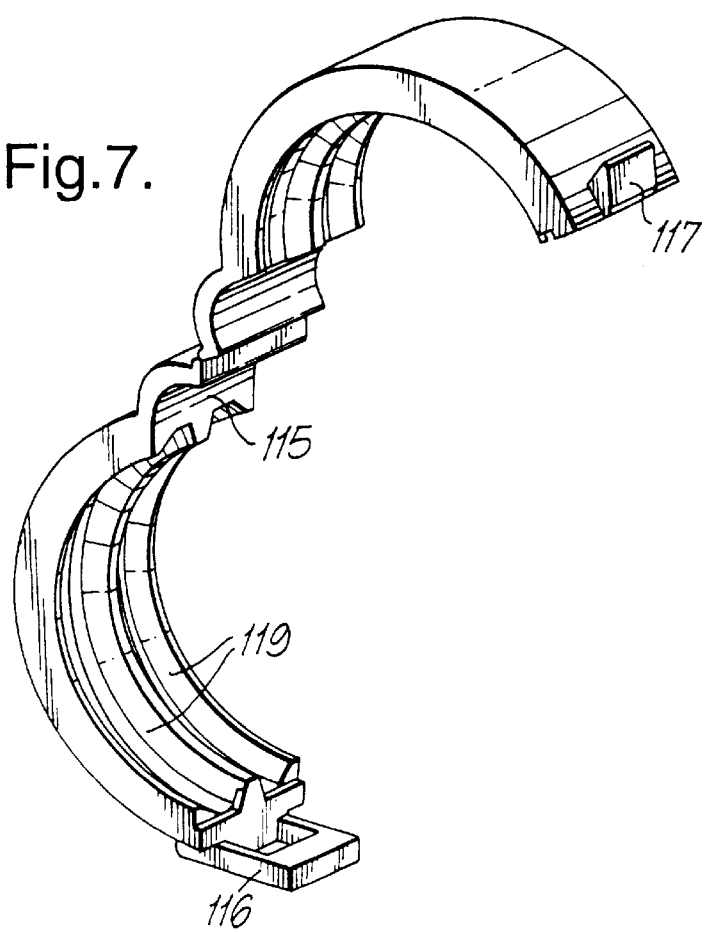
FIG. 7 is an isometric view of the connecting collar in the open condition.

With reference to FIGS. 5 to 7, there is disclosed an in-line coaxial cable connection housing 111 which comprises two housing 11 joined together by an annular collar 112.

The collar 112 comprises two semi-circular portions 113, 114 which are hinged together by integral hinge 115 at one pair of adjacent ends and have a snap-fit connection 116, 117 at other ends thereof. The radially inner surface of the collar 112 has a pair of annular grooves 119 therein. These grooves 119 cooperate with the annular bosses 28 on the housings 11 to hold the two housings 11 coaxially in alignment and prevent separation.

We claim:

1. A cable connector housing for surrounding and sealing a connection between a cable and a connector, the housing comprising:

a first elongate body portion having detents;

a second elongate body portion having resilient arms to connect to said detents of said first elongate body portion so as to surround the cable and the connector;

the housing having a first end having a smaller opening for accommodating the cable and a second end longitudinally displaced from said first end and having a larger opening to accommodate the connector;

the housing being configured so as to force a sealant contained within the housing towards said second end of the housing when the elongate body portions are assembled around the connection;

wherein at least one of said first elongate body portion or said second elongate body portion further comprise a plurality of radially inwardly projecting members positioned adjacent the second end of the housing so as to secure the housing to the connector when said elongate body portions are in an assembled position around the connection; and wherein said first end of the housing includes a frusto-conical portion positioned so as to force a sealant contained within the housing towards said second end of the housing when the first and second elongate body portions are assembled around the connection.

2. A housing according to claim 1 wherein the first elongate body portion and the second elongate body portion are hinged together as a unitary piece along adjacent longitudinal edges.

3. A housing according to claim 1 wherein the first elongate body portion and the second elongate body portion include a snap-fit connection to maintain the first and second elongate body portions in an assembled position around the connection.

4. A housing according to claim 1 wherein an external surface of the housing at the second end has a raised annular boss thereon configured so as to engage a surrounding collar.

5. A housing as claimed in claim 1, which additionally comprises a sealant contained within at least one of said first or said second elongate body portions.

6. A housing as claimed in claim 5, wherein the sealant is a gel which is maintained under compression by the housing when assembled around the connection and which has a cone penetration of 50–350 ($10^{-1}$ mm) and an ultimate elongation of at least 100%.

7. An in-line cable connector assembly for protecting an in-line connection of two coaxial cables comprising;

a first housing comprising:

a first elongate body portion;

a second elongate body portion connected to said first elongate body portion by means so as to surround a portion of the in-line connection;

the first housing having a first end having an opening for accommodating a first one of the cables and a second end longitudinally displaced from said first end, said second end having a second opening and a raised annular boss on an external surface of the first housing;

a second housing comprising;

a third elongate body portion;

a fourth elongate body portion connected to said third elongate body portion by latching means so as to surround a portion of the in-line connection;

the second housing having a third end having an opening for accommodating a second one of the cables and a fourth end longitudinally displaced from said third end, said fourth end having a fourth opening and a raised annular boss on an external surface of the second housing;

a sealant contained within said first housing;

wherein said first housing is configured so as to force said sealant towards said second end of said first housing when said first and second elongate body portions are assembled around the in-line connection; and an annular collar configured to mate with said raised annular boss of said first housing and with said raised annular boss of said second housing so as to connect said first housing to said second housing to protect the in-line connection when said first and second elongate body portions and said third and four elongate body portions are assembled around the in-line connection.

8. An in-line cable connector assembly according to claim 7 wherein said annular collar engages axially outer surfaces of said raised annular bosses of said first housing and said second housing to prevent separation of said housings.

9. An in-line connector assembly according to claim 7 wherein said annular collar comprises a first semi-circular portion and a second semi-circular portion hinged to said first semi-circular portion at a first edge of each of said semi-circular portions, an opposite edge of each of said semi-circular portions including a snap-fit member.

* * * * *